(12) United States Patent (10) Patent No.: US 7,813,328 B2
Rudolf et al. (45) Date of Patent: Oct. 12, 2010

(54) METHOD AND SYSTEM FOR TRANSFERRING WIRELESS TRANSMIT/RECEIVE UNIT-SPECIFIC INFORMATION

(75) Inventors: Marian Rudolf, Montreal (CA); Stephen E. Terry, Northport, NY (US); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 12/559,641

(22) Filed: Sep. 15, 2009

(65) Prior Publication Data

US 2010/0002648 A1 Jan. 7, 2010

Related U.S. Application Data

(63) Continuation of application No. 10/980,723, filed on Nov. 3, 2004, now Pat. No. 7,599,339.

(60) Provisional application No. 60/519,436, filed on Nov. 12, 2003.

(51) Int. Cl.
*H04W 16/00* (2009.01)
(52) U.S. Cl. ..................................... 370/338; 370/329
(58) Field of Classification Search ................ 370/328, 370/338, 341, 466, 329; 455/449, 561
See application file for complete search history.

(56) References Cited

U.S. PATENT DOCUMENTS

| | | | |
|---|---|---|---|
| 6,307,867 B1 | 10/2001 | Roobol et al. | |
| 6,356,607 B1 | 3/2002 | Scott et al. | |
| 6,504,835 B1 | 1/2003 | Menzel et al. | |
| 6,546,062 B1 | 4/2003 | Du et al. | |
| 6,757,270 B1 | 6/2004 | Kumar et al. | |
| 6,901,104 B1 | 5/2005 | Du et al. | |
| 7,054,633 B2 | 5/2006 | Seo et al. | |
| 7,130,638 B2 | 10/2006 | Chen et al. | |
| 7,142,525 B2 | 11/2006 | Dolwin | |
| 7,392,054 B2 * | 6/2008 | Cho et al. | .................. 455/447 |

(Continued)

FOREIGN PATENT DOCUMENTS

EP 1139605 10/2001

(Continued)

OTHER PUBLICATIONS

3$^{rd}$ Generation Partnership Project; Technical Specification Group Radio Access Network; High Speed Downlink Packet Access (HSDPA); Overall Description; Stage 2 (Release 6), 3GPP TS 25.308 V6.2.0 (Sep. 2004).

(Continued)

*Primary Examiner*—Sam Bhattacharya
(74) *Attorney, Agent, or Firm*—Volpe and Koenig, P.C.

(57) ABSTRACT

The present invention is related to a method and system for transferring wireless transmit/receive unit (WTRU)-specific information to support enhanced uplink (EU) operation in a wireless communication system. A radio network controller (RNC) obtains WTRU-specific information, and transfers the WTRU-specific information to the Node-Bs. Each Node-B is configured to schedule uplink transmissions from a WTRU and utilizes the WTRU-specific information in operation of EU transmissions.

14 Claims, 1 Drawing Sheet

U.S. PATENT DOCUMENTS

| | | | |
|---|---|---|---|
| 2001/0036823 A1 | 11/2001 | Van Lieshout et al. |
| 2003/0214928 A1 | 11/2003 | Chuah |
| 2003/0219037 A1 | 11/2003 | Toskala et al. |
| 2005/0043030 A1 | 2/2005 | Shariat et al. |

FOREIGN PATENT DOCUMENTS

| | | |
|---|---|---|
| GB | 2358551 | 7/2001 |
| TW | 364242 | 7/1999 |
| WO | 00/69184 | 11/2000 |
| WO | 02/01769 | 1/2002 |
| WO | 03/003643 | 1/2003 |

OTHER PUBLICATIONS

3rd Generation Partnership Project; Technical Specification Group Radio Access Network; High Speed Downlink Packet Access (HSDPA); Overall Description; Stage 2 (Release 5), 3GPP TS 25.308 V5.4.0 (Mar. 2003).

3rd Generation Partnership Project; Technical Specification Group Radio Access Network; FDD Enhanced Uplink; Overall Description; Stage 2 (Release 6), 3GPP TS 25.309 V6.0.0 (Sep. 2004).

3rd Generation Partnership Project; Technical Specification Group Radio Access Network; Medium Access Control (MAC) Protocol Specification; (Release 6), 3GPP TS 25.321 V6.2.0 (Jun. 2004).

3rd Generation Partnership Project; Technical Specification Group Radio Access Network; Medium Access Control (MAC) Protocol Specification; (Release 5), 3GPP TS 25.321 V5.6.0 (Sep. 2003).

* cited by examiner

METHOD AND SYSTEM FOR TRANSFERRING WIRELESS TRANSMIT/RECEIVE UNIT-SPECIFIC INFORMATION

CROSS REFERENCE TO RELATED APPLICATIONS

This application is a continuation of U.S. patent application Ser. No. 10/980,723, filed Nov. 3, 2004, which claims the benefit of U.S. Provisional Application No. 60/519,436 filed Nov. 12, 2003, which is incorporated by reference as if fully set forth.

FIELD OF INVENTION

The present invention is related to a wireless communication system. More particularly, the present invention is a method and system for transferring wireless transmit/receive unit (WTRU)-specific information.

BACKGROUND

In wireless communication systems implementing the Third Generation Partnership Project (3GPP) standards, the Radio Network Controller (RNC) maintains overall control of transmissions to WTRUs and knows the capabilities of each WTRU. However, the current scheme often incurs problems with throughput and transmission latency. In order to improve upon the current scheme, the Node-Bs may be relied upon to schedule and assign uplink (UL) radio resources to WTRUs. Node-Bs can make more efficient decisions and manage UL radio resources on a short-term basis better than an RNC, even if the RNC retains overall control over Node-Bs.

In order for a Node-B to assign UL radio resources to WTRUs in enhanced uplink (EU) operation, the Node-B must know several WTRU-specific parameters. Under the current 3GPP standard, only the RNC knows the WTRU-specific parameters. The RNC obtains this information via radio resource control (RRC) messages conveying WTRU-specific information. Therefore, it is necessary to forward the information to the Node-B for proper scheduling of radio resources in EU transmissions.

SUMMARY

The present invention is a method and system for transferring WTRU-specific information to the Node-Bs to support EU operation in a wireless communication system. An RNC obtains WTRU-specific information and transfers the WTRU-specific information to the Node-Bs. Each Node-B is configured to schedule UL transmissions from a WTRU and utilizes the WTRU-specific information in operation of EU transmissions.

DETAILED DESCRIPTION OF THE PREFERRED EMBODIMENTS

Figure 1:
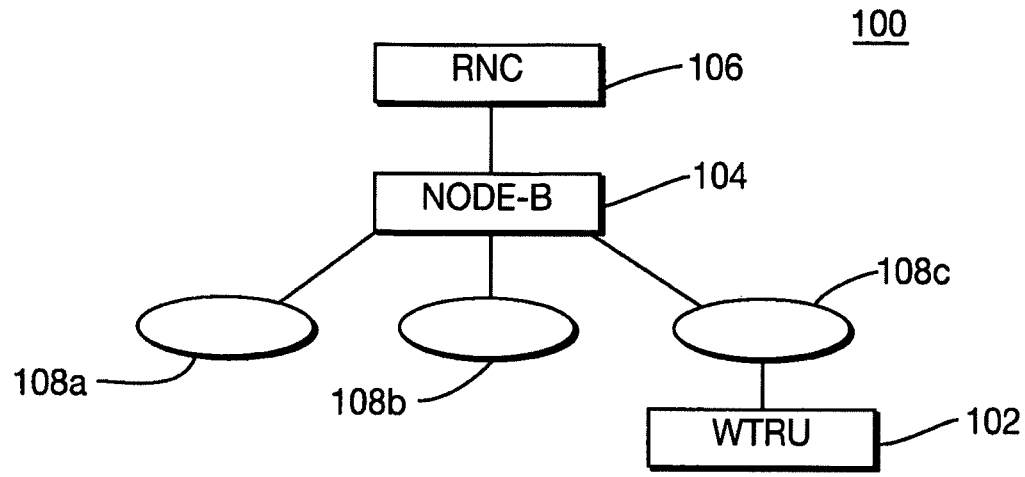
FIG. 1 is a diagram of a wireless communication system.

The present invention will be described with reference to the drawing figures wherein like numerals represent like elements throughout.

Hereafter, the terminology "WTRU" includes but is not limited to a user equipment, a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

FIG. 1 is a block diagram of a wireless communication system 100 in which an RNC 106 controls a plurality of Node-Bs 104, (only one being shown), and each Node-B 104 covers one or more cells 108a, 108b, 108c. There is typically one "serving cell" that serves the WTRU 102, but the WTRU 102 may be in soft handover with several cells at one time. For example, in EU operation, UL transmissions are scheduled and radio resources are assigned by the Node-B 104 to the WTRU 102 through a "serving" cell, for example cell 108c, to which the WTRU 102 has established a connection. The WTRU 102 may also be connected to other cells in support of soft handover.

Figure 2:
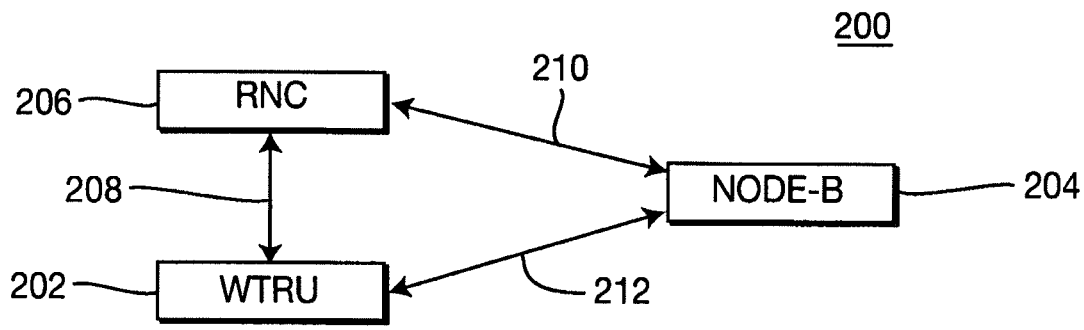
FIG. 2 is a block diagram for transferring WTRU-specific information among network entities in accordance with the present invention.

FIG. 2 is a block diagram of a system 200 for transferring WTRU-specific information to support EU operation in accordance with the present invention. The system 200 includes at least one WTRU 202, at least one Node-B 204, and at least one RNC 206. Communication links support signaling 208, 210, 212 between the WTRU 202, the Node-B 204 and the RNC 206. Initially, an RNC 206 obtains WTRU-specific information from a WTRU 202 using RRC messaging 208 during the initial connection. The information transferred from the WTRU 202 that is needed by the Node-B 204 is primarily physical transmission and reception capability information. The WTRU-specific information is then forwarded from the RNC 206 to a Node-B 204 to be used in scheduling UL transmissions for the WTRU 202.

A new signaling procedure may be utilized to transfer the information from the RNC 206 to the Node-B 204. Alternatively, the existing mechanisms, (for example the Radio Link Setup procedure over Iur and Iub interfaces), may be modified in order for the RNC 206 to forward relevant WTRU-specific information to the Node-B 204. Although the specific protocol or format used to transmit the information is not critical to the present invention, by way of the present example, the transfer of the information from the RNC 206 to the Node-B 204 is via Iub interface 210 and Iur interface. The RNC 206 transfers the WTRU-specific information to the Node-B 204 via the Radio Network Subsystem Application Protocol (RNSAP) control procedure (over the Iur interface) and the Node B Application Part (NBAP) control protocol (over the Iur interface). This information may be signaled along with the Radio Link Setup procedure in the UTRAN.

The forwarding of the WTRU-specific information may occur in response to a discrete event, such as when the WTRU 202 enters or establishes service in the service area covered by the RNC 206, or when the WTRU 202 leaves the service area. Alternatively, the forwarding of the WTRU specific information may occur periodically during the lifetime of a radio link whereby the WTRU 202 updates the WTRU-specific information.

The transfer of the WTRU-specific information may be initiated by either the RNC 206 or the Node-B 204. If it is initiated by the RNC 206, the WTRU-specific information is transferred at the initiation of the service or at the detection of change of WTRU-specific information from the RNC 206 to the Node-Bs 204. Alternatively, a Node-B 204 may request the information to be forwarded from the RNC 206 to the Node-B 204, and the RNC 206 subsequently transfers the information upon receipt of the request from the Node-B 204.

WTRU-specific information includes, but is not limited to: WTRU capabilities with respect to EU; information affecting data rates and throughput; and information regarding physical and transport channel characteristics allocated to a WTRU and relevant to a Node-B.

Information affecting data rates and throughput includes, but is not limited to: the number of multi-codes supported for UL physical channels; modulation schemes and coding rates supported for UL physical channels; automatic repeat request (ARQ) buffer or memory sizes in the WTRU; WTRU power class; number of hybrid ARQ (H-ARQ) processes supported in the WTRU; the form of available WTRU memory for EU; supported bit rates and bits receivable per transmit time interval (TTI) at layer 1 (L1) or layer 2 (L2) level; and capability for simultaneous reception of other than EU-specific channels by the WTRU.

Information on physical and transport channel characteristics includes, but is not limited to: maximum or minimum power settings of UL or DL physical channels; shared or dedicated physical channels allocated by that WTRU (spreading and scrambling codes, periodicity or enumerations of time intervals when the WTRU can be allocated shared channel usage); and information on HSDPA WTRU capability class for DL services.

The present invention is applicable to both frequency division duplex (FDD) and time division duplex (TDD) modes. Because of the commonality of higher layer (RRC or via Iur/Iub) signaling for FDD and TDD modes, all parameters listed above also apply to a TDD mode. For a TDD application, some TDD-only parameters should also be included, such as number of EU TDD service timeslots per WTRU, number of EU TDD spreading codes per WTRU and per time slot, and allowable and configurable power settings of physical channels of EU TDD WTRU per timeslot and per WTRU.

High Speed Data Packet Architecture (HSDPA) WTRU capabilities for DL data transmissions have several common attributes to EU WTRU capabilities for UL data transmissions. Since a Node-B provides scheduling of both DL HSDPA and UL EU services, the Node-B has the ability to dynamically distribute capabilities between UL and DL services, potentially on a TTI basis, and to better determine UL and DL transmissions for improved quality of service (QoS) and more efficient use of radio resources.

Figure 3:
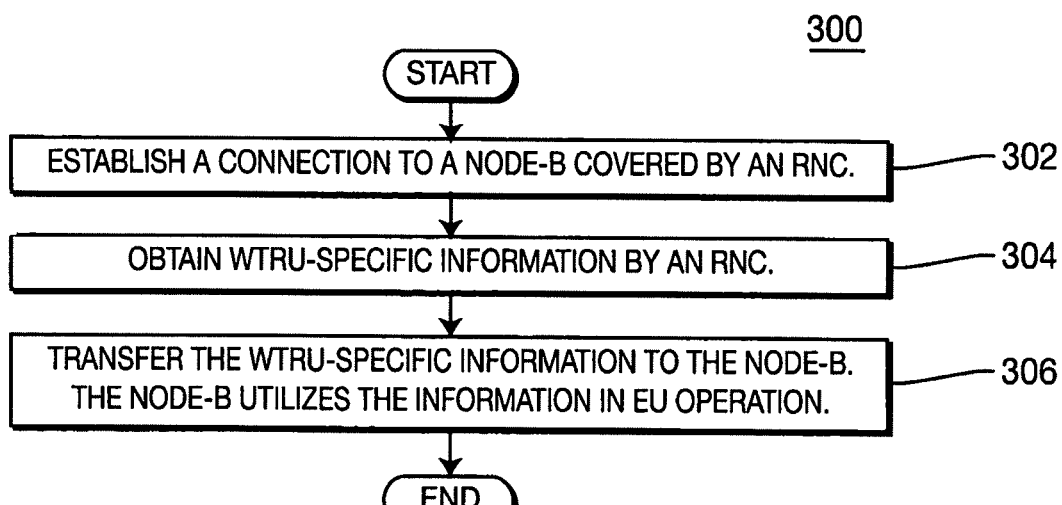
FIG. 3 is a flow diagram of a process for transferring WTRU-specific information in accordance with the present invention.

FIG. 3 is a flow diagram of a process 300 for transferring WTRU-specific information in accordance with the present invention. A WTRU 202 establishes a connection 212 to a Node-B 204 in a region covered by an RNC 206 (step 202). The RNC 206 obtains WTRU-specific information from the WTRU 202 using RRC messaging (step 204). The RNC 206 transfers the WTRU-specific information to the Node-B 204 (step 206). The transfer of WTRU-specific information may be initiated by the Node-B 204. The Node-B 204 is configured to schedule UL transmissions from the WTRU 202, and utilize the WTRU-specific information in operation of EU transmission.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A method for efficient scheduling of enhanced uplink (EU) transmissions, the method comprising:
   a Node-B receiving wireless transmit/receive unit (WTRU)-specific information from a radio network controller (RNC), the WTRU-specific information being used for scheduling EU transmissions from a WTRU; and
   the Node-B scheduling EU transmissions from the WTRU to the Node-B utilizing the WTRU-specific information.

2. The method of claim 1 wherein the WTRU-specific information includes WTRU capability information with respect to EU and high speed downlink packet access (HSDPA).

3. The method of claim 1 wherein the WTRU-specific information includes information affecting data rates and throughput.

4. The method of claim 1 wherein the WTRU-specific information includes information on physical and transport channel characteristics.

5. The method of claim 1 wherein the WTRU-specific information includes time division duplex (TDD)-specific parameters.

6. The method of claim 1 wherein the WTRU-specific information is received upon establishment of a service and upon any change of the WTRU-specific information.

7. The method of claim 1 wherein the WTRU-specific information is received periodically.

8. A Node-B for efficient scheduling of enhanced uplink (EU) transmissions, the Node-B comprising:
   a receiver for receiving wireless transmit/receive unit (WTRU)-specific information from a radio network controller (RNC), the WTRU-specific information being used for scheduling EU transmissions from a WTRU; and
   a scheduler configured to schedule EU transmissions from the WTRU to the Node-B utilizing the WTRU-specific information.

9. The Node-B of claim 8 wherein the WTRU-specific information includes WTRU capability information with respect to enhanced uplink (EU) and high speed downlink packet access (HSDPA).

10. The Node-B of claim 8 wherein the WTRU-specific information includes information affecting data rates and throughput.

11. The Node-B of claim 8 wherein the WTRU-specific information includes information on physical and transport channel characteristics.

12. The Node-B of claim 8 wherein the WTRU-specific information includes time division duplex (TDD)-specific parameters.

13. The Node-B of claim 8 wherein the WTRU-specific information is received upon establishment of a service and upon any change of the WTRU-specific information.

14. The Node-B of claim 8 wherein the WTRU-specific information is received periodically.

* * * * *